(12) United States Patent
Guichard et al.

(10) Patent No.: US 10,815,546 B2
(45) Date of Patent: Oct. 27, 2020

(54) HIGHLY MODULAR LOADING TOOLS

(71) Applicant: ARIANEGROUP SAS, Paris (FR)

(72) Inventors: Frédéric Guichard, Saint-Medard en Jalles (FR); Jean-Pierre Maumus, Saint-Medard en Jalles (FR); Sébastien Chauffaille, Francs (FR)

(73) Assignee: ARIANEGROUP SAS, Paris (FR)

( * ) Notice: Subject to any disclaimer, the term of this patent is extended or adjusted under 35 U.S.C. 154(b) by 96 days.

(21) Appl. No.: 16/097,062

(22) PCT Filed: Apr. 27, 2017

(86) PCT No.: PCT/FR2017/050993
§ 371 (c)(1),
(2) Date: Oct. 26, 2018

(87) PCT Pub. No.: WO2017/187089
PCT Pub. Date: Nov. 2, 2017

(65) Prior Publication Data
US 2019/0144964 A1    May 16, 2019

(30) Foreign Application Priority Data

Apr. 28, 2016 (FR) ..................................... 16 53808

(51) Int. Cl.
*F27D 5/00* (2006.01)
*A47B 87/02* (2006.01)
(Continued)

(52) U.S. Cl.
CPC ............ *C21D 9/0025* (2013.01); *B29C 70/16* (2013.01); *F27D 3/02* (2013.01); *F27D 5/0006* (2013.01);
(Continued)

(58) Field of Classification Search
CPC .... F27D 3/0021; F27D 5/0012; F27D 5/0031; F27M 2001/1504; C21D 9/0025;
(Continued)

(56) References Cited

U.S. PATENT DOCUMENTS 3,388,806 A * 6/1968 Cunningham, Jr. ..... D01H 1/18
211/85.5
3,698,698 A * 10/1972 Kreider ................ C21D 9/0025
432/253
(Continued)

FOREIGN PATENT DOCUMENTS

DE    103 12 802 B3    7/2004
EP    2 910 884 A1    8/2015
(Continued)

OTHER PUBLICATIONS

International Preliminary Report on Patentability and the Written Opinion of the International Searching Authority as issued in International Patent Application No. PCT/FR2017/050993, dated Oct. 30, 2018.
(Continued)

*Primary Examiner* — Gregory A Wilson
(74) *Attorney, Agent, or Firm* — Pillsbury Winthrop Shaw Pittman LLP (57) ABSTRACT

A loading tooling for thermochemical treatment of parts includes at least first and second loading stages stacked one on the other in separable manner, each loading stage including a rack extending in a horizontal plane. The rack is supported by four legs extending in a vertical direction with the legs of the second loading stage standing on the legs of the first loading stage. The rack has a plurality of support arms secured thereto, with the plurality of support arms of the first loading stage presenting an arrangement that is
(Continued)

different from the arrangement of the plurality of support arms of the second loading stage.

8 Claims, 5 Drawing Sheets

(51) Int. Cl.
*C21D 9/00* (2006.01)
*F27D 3/02* (2006.01)
*B29C 70/16* (2006.01)
*B29K 307/04* (2006.01)

(52) U.S. Cl.
CPC ......... *F27D 5/0012* (2013.01); *F27D 5/0056* (2013.01); *B29K 2307/04* (2013.01); *F27D 2005/0081* (2013.01)

(58) Field of Classification Search
CPC ............ A47B 47/0091; A47B 87/0207; A47B 87/0215; A47B 87/0223; A47B 87/0246
See application file for complete search history.

(56) References Cited

U.S. PATENT DOCUMENTS

| | | | | | |
|---|---|---|---|---|---|
| 3,739,921 | A | * | 6/1973 | Schmidt | F16B 7/00 211/194 |
| 4,227,874 | A | * | 10/1980 | Nugent | B32B 15/01 148/240 |
| 4,487,579 | A | * | 12/1984 | Irwin | F27D 5/0006 432/137 |
| 4,501,369 | A | * | 2/1985 | Fox | A47F 5/103 108/147.12 |
| 4,773,850 | A | * | 9/1988 | Bushman | F27B 9/023 432/12 |
| 5,411,153 | A | * | 5/1995 | Unfried | A47B 87/0215 108/180 |
| 5,836,760 | A | * | 11/1998 | Turner | A47B 87/0246 432/253 |
| 6,119,875 | A | * | 9/2000 | Smith | A47F 5/112 211/195 |
| 6,129,224 | A | * | 10/2000 | Mingers | A47B 57/482 211/190 |
| 6,401,941 | B1 | * | 6/2002 | Maumus | F27D 3/12 211/59.1 |
| 6,644,966 | B1 | | 11/2003 | Chiang | |
| 7,384,264 | B2 | * | 6/2008 | Ego | B29C 70/34 108/190 |
| 9,869,004 | B2 | * | 1/2018 | Perkins | C21D 9/00 |
| 2009/0084470 | A1 | * | 4/2009 | Kato | C21D 9/0025 148/225 |
| 2015/0232959 | A1 | | 8/2015 | Gahagan et al. | |
| 2018/0266766 | A1 | * | 9/2018 | Chen | F27B 9/10 |

FOREIGN PATENT DOCUMENTS

| | | | |
|---|---|---|---|
| FR | 2 319 866 A1 | 2/1977 | |
| FR | 2319866 A1 * | 2/1977 | ........... C21D 9/0025 |
| WO | WO 2015/122912 A1 | 8/2015 | |

OTHER PUBLICATIONS

International Search Report as issued in International Patent Application No. PCT/FR2017/050993, dated Sep. 15, 2017.

* cited by examiner

HIGHLY MODULAR LOADING TOOLS

CROSS REFERENCE TO RELATED APPLICATIONS

This application is the U.S. National Stage of PCT/FR2017/050993 filed Apr. 27, 2017, which in turn claims priority to French Application No. 1653808, filed Apr. 28, 2016. The contents of both applications are incorporated herein by reference in their entirety.

BACKGROUND OF THE INVENTION

The present invention relates to loading tooling used for supporting parts made of metal materials during heat treatment or thermochemical treatment of those parts, such as annealing, diffusion heat treatment, chemical conversion treatment, forming a surface coating, etc.

Parts for heat treatment or for thermochemical treatment can be loaded into an oven "in bulk", i.e. in baskets in which the parts are jumbled. Although that type of loading tooling enables parts of different shape or sizes to be processed and enables a relatively large filling ratio to be obtained for the oven, it does not guarantee that the parts will be treated uniformly. Typically, when a gas phase is needed during the heat treatment, the gas does not flow in uniform manner relative to each part, which leads to non-uniformity in the treatment of parts in a given batch.

Another solution consists in using loading tooling that presents specific support devices enabling parts to be supported in ordered manner, providing they have shapes and/or dimensions that are similar. Although that second solution enables the parts to be treated in more uniform manner, it is nevertheless penalizing in terms of the loading capacity of the oven.

There therefore exists a need to optimize the filling ratio of a treatment oven while ensuring that the parts are treated uniformly.

OBJECT AND SUMMARY OF THE INVENTION

To this end, the present invention provides loading tooling for thermochemical treatment of parts, the tooling comprising at least first and second loading stages stacked one on the other in separable manner, each loading stage comprising a rack extending in a horizontal plane, the rack being supported by four legs extending in a vertical direction with the legs of the second loading stage standing on the legs of the first loading stage, and the rack having a plurality of support arms secured thereto with the plurality of support arms of the first loading stage presenting an arrangement that is different from the arrangement of the plurality of support arms of the second loading stage;

the tooling being characterized in that the rack of the first loading stage comprises a central crossbar, a plurality of support arms extending on either side of the central crossbar in a direction parallel to the horizontal plane of the rack, the arms of the first plurality of support arms each presenting a free end and being spaced apart from one another at a first distance, and in that the rack of the second loading stage comprises a central crossbar, a second plurality of support arms, each presenting a free end and extending on either side of the central crossbar in a direction parallel to the horizontal plane of the rack, the arms of the second plurality of support arms being spaced apart from one another by a second distance different from the first distance.

The loading tooling of the present invention is advantageous in particular in that it provides great modularity among the loading stages, the support arms of each stage being capable of being adapted to support parts presenting dimensions and/or shapes that are different from the dimensions and/or shapes of the parts supported by another loading stage. It is thus possible in a single load made up by using the loading tooling of the invention to have parts of shapes and/or dimensions that are different, thus making it possible to optimize the filling ratio of the oven while enabling uniform treatment of each part.

In addition, this configuration of the loading tooling enables a load to be made up of suspended parts having shapes and/or dimensions that are different.

According to a first particular characteristic of the loading tooling of the invention, each loading stage is made of carbon/carbon composite material. Under such circumstances, the support arms of the plurality of support arms of each loading stage may be coated in a layer of ceramic material.

Each loading stage may equally well be made of ceramic matrix composite material or of oxide/oxide type ceramic matrix composite material, or out of a metal material that withstands high temperatures.

According to a second particular characteristic of the loading tooling of the invention, the bottom portions of the legs of each loading is configured to engage with the top portions of the legs of each loading stage. This facilitates installing and maintaining the stack of loading stages.

According to a third particular characteristic of the loading tooling of the invention, the legs of each loading stage are adjustable in height.

According to a fourth particular characteristic of the loading tooling of the invention, the support arms of each loading stage are separably fastened to the rack of said loading stage. This makes it possible to further increase the modularity of the loading tooling.

The invention also provides an installation for heat treatment or thermochemical treatment of parts, the installation comprising a treatment chamber and one or more stacks of loading tooling of the invention present in said treatment chamber, the or each loading stage of the loading tooling supporting parts of shapes or dimensions that are different.

BRIEF DESCRIPTION OF THE DRAWINGS

Other characteristics and advantages of the invention appear from the following description of particular embodiments of the invention, given as non-limiting examples, and with reference to the accompanying drawings, in which.

DETAILED DESCRIPTION OF AN EMBODIMENT

The invention applies in general manner to loading tooling for supporting parts made of metal material during heat treatment or thermochemical treatment of those parts in treatment installations or ovens.

Figure 1:
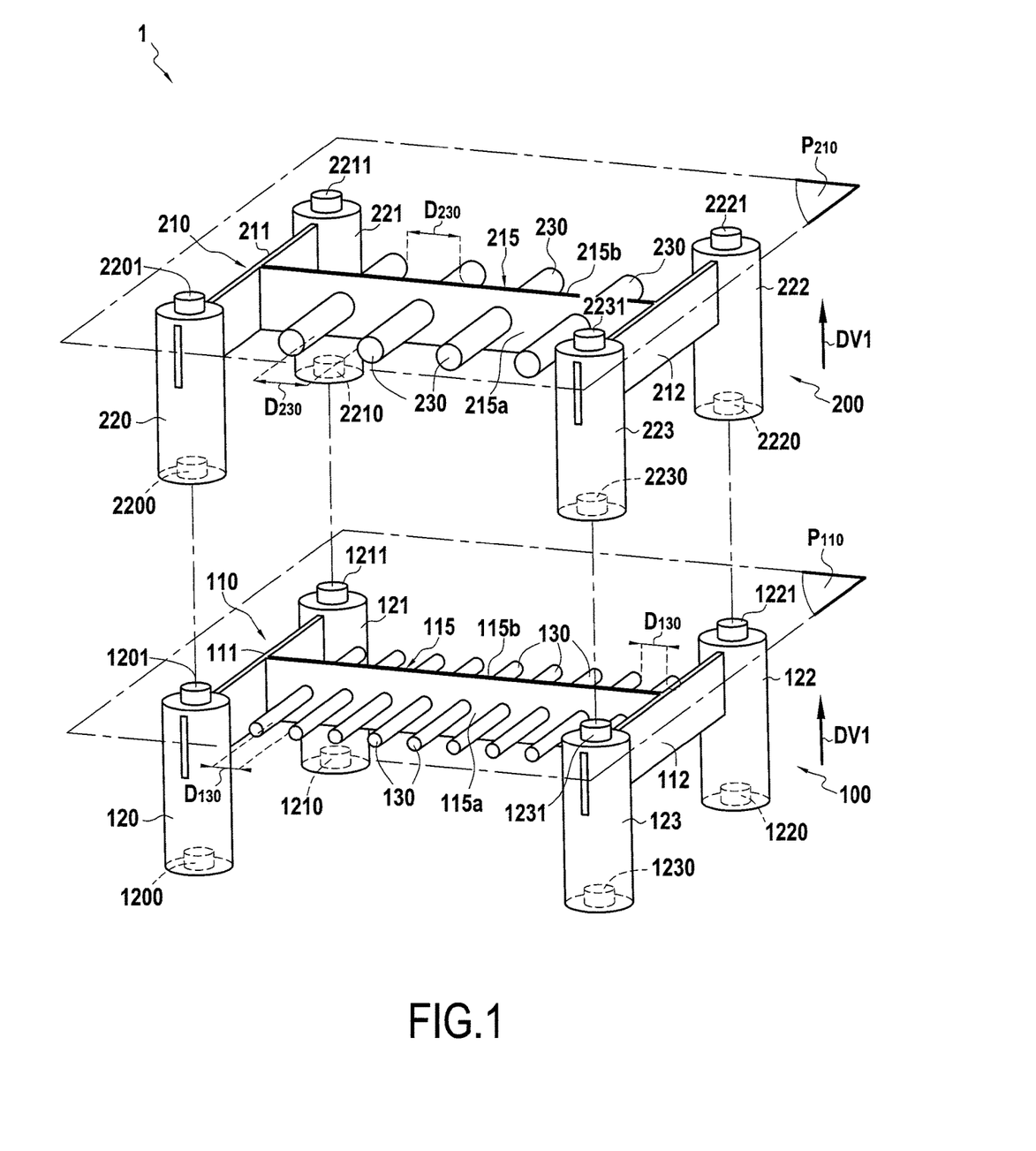
FIG. 1 is an exploded view of loading tooling in an embodiment of the invention.
Figure 2:
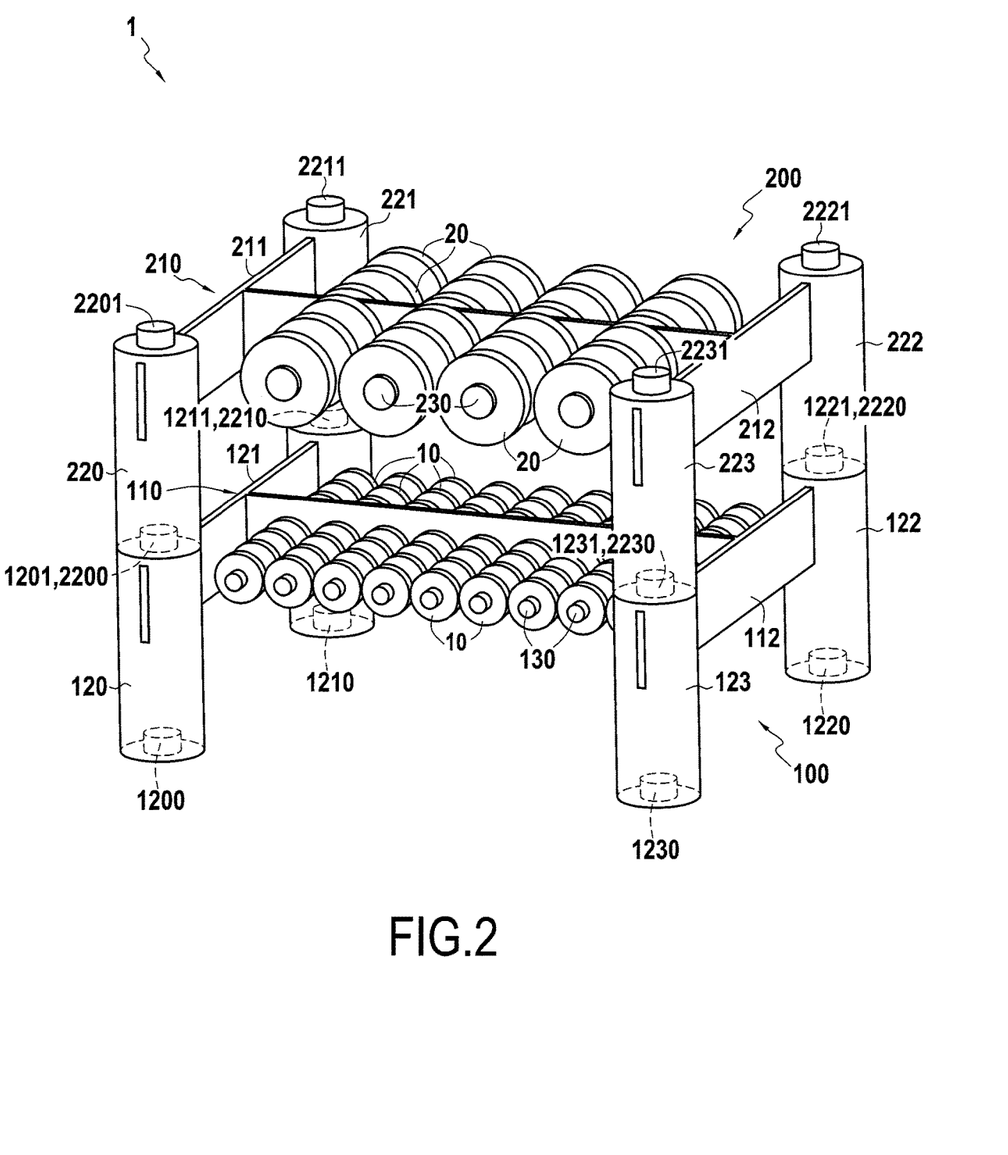
FIG. 2 is a diagrammatic perspective view of the support tooling of FIG. 1, once assembled and loaded with parts.

FIGS. 1 and 2 show loading tooling 1 in accordance with an embodiment of the invention. In this example, the loading tooling 1 comprises a first loading stage 100 and a second loading stage 200 that is designed to be assembled on the first stage 100. The first stage 100 comprises a rack 110 that is supported by four legs 120, 121, 122, and 123. More precisely, the rack 110 comprises a first edge crossbar 111 that connects together the legs 120 and 121 and a second edge crossbar 112 that connects together the legs 122 and 123. A central crossbar 115 extends between the two edge crossbars 111 and 112 and is secured to them. The rack 110 is rectangular in shape. The rack 110 lies in a horizontal plane P110 with the legs 120 to 123 extending in a vertical direction DV1 perpendicular to the plane $P_{110}$. Support arms 130 extend on either side of the central crossbar 115. More precisely, beside a first face 115a, the central crossbar 115 has a first row of support arms 130 and beside a second face 115b it has a second row of support arms 130. Each support arm 130 extends in a direction parallel to the horizontal plane $P_{110}$ of the rack 110. The arms 130 are spaced apart from one another by a distance $D_{130}$ that is determined as a function of the dimensions and/or of the shape of the parts that they are to support.

The second stage 200 comprises a rack 210 supported by four legs 220, 221, 222, and 223, the rack 210 having a first edge crossbar 211 connecting together the legs 220 and 221, and a second edge crossbar 212 connecting together the legs 222 and 223. A central crossbar 215 extends between the two edge crossbars 211 and 212 and is secured thereto. The rack 210 is rectangular in shape. The rack 210 extends in a horizontal plane $P_{210}$, the legs 220 to 223 extending in the vertical direction DV1 perpendicular to the plane $P_{210}$. Support arms 330 extend respectively from either side of the central crossbar 215. More precisely, beside a first face 215a, the central crossbar 215 has a first row of support arms 230 and beside a second face 215b it has a second row of support arms 230. Each arm 230 extends in a direction parallel to the horizontal plane $P_{210}$ of the rack 210. The arms 230 are spaced apart from one another by a distance $D_{230}$ that is determined as a function of the dimensions and/or the shape of the parts that they are to support.

In the embodiment described in FIGS. 1 and 2, the arms 130 of the first loading stage 100 are in an arrangement that is different from the arms 230 of the second loading stage 200 in that the arms 230 are spaced apart from one another by a distance $D_{230}$ that is greater than the distance $D_{130}$ at which the arms 130 of the first loading stage are spaced apart, the second loading stage 200 thus having a number of support arms 230 that is smaller than the number of support arms 130 present in the first loading stage.

Thus, the loading tooling 1 is suitable for supporting parts of different dimensions and/or shapes. Specifically, as shown in FIG. 2, the second loading stage 200 is loaded with annular parts 20, each presenting a diameter greater than the diameter of annular parts 10 that are loaded on the first loading stage 100. In addition, since the annular parts 10 and 20 are supported by horizontal support arms, they can be arranged in ordered manner one beside another without contact between the parts and with minimized contact area with the support arms, thereby ensuring that all of the parts supported by the loading tooling are treated uniformly.

Furthermore, as shown in FIG. 1, the legs 120 to 123 of the first loading stage 100 have respective circular recesses 1200, 1210, 1220, and 1230 in their bottom portions, and circular centering elements 1201, 1211, 1221, and 1231 at their top portions, projecting from the top surfaces of the legs. Likewise, the legs 220 to 223 of the second loading shape 200 have respective circular recesses 2200, 2210, 2220, and 2230 in their bottom portions and respective circular centering elements 2201, 2211, 2221, and 2231 at their top portions projecting from the top surfaces of the legs. The circular recesses present in the legs of a loading stage, in this example the recesses 2200, 2201, 2220, and 2230 of the legs 220 to 223 of the second loading stage 200, are for receiving the circular center elements of the legs of another loading stage, in this example the circular centering elements 1201, 1211, 1221, and 1231 of the first loading stage 100 on which the loading stage is placed. This serves both to facilitate positioning loading stages while they are being stacked and to facilitate keeping them in position on one another in the loading tooling stack. The elements used in the bottom and top portions of the legs of each loading stage enabling the legs of one load to be engaged with the legs of another load that is adjacent in the stack could naturally have shapes other than those described above.

Figure 3:
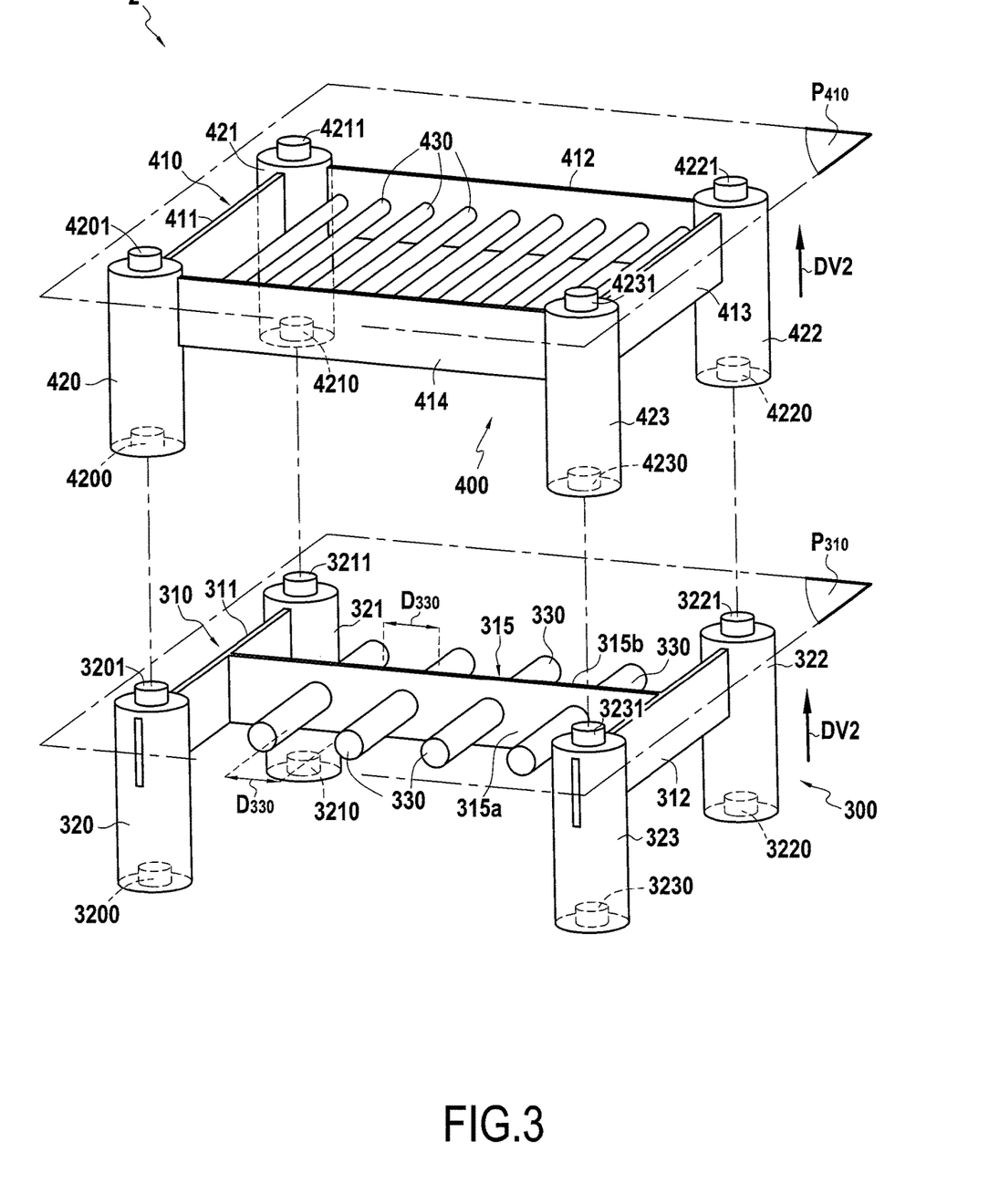
FIG. 3 is an exploded view of loading tooling in another embodiment of the invention.
Figure 4:
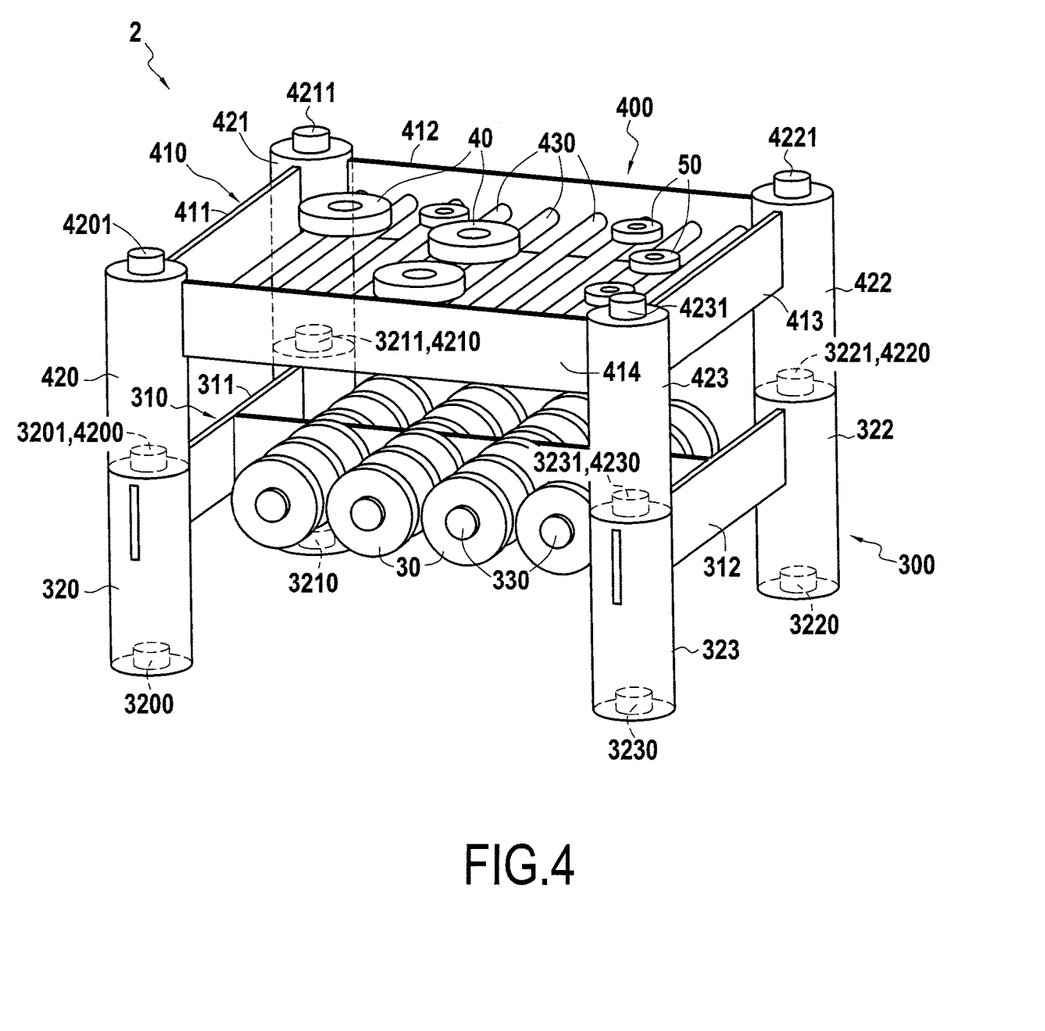
FIG. 4 is a diagrammatic perspective view of the support tooling of FIG. 3, once assembled and loaded with parts.

FIGS. 3 and 4 show loading tooling 2 in another embodiment of the invention. The loading tooling 2 differs from the loading tooling 1 described with reference to FIGS. 1 and 2 in that the second loading stage defines a horizontal loading tray. The loading tooling 2 in this example comprises a first loading stage 300 and a second loading stage 400 that is to be mounted on the first stage 200. The first stage 300 comprises a rack 310 that is supported by four legs 320, 321, 322, and 323, the rack 310 comprising a first edge crossbar 311 that connects together the legs 320 and 321 and a second edge crossbar 312 that connects together the legs 322 and 323. A central crossbar 315 extends between the two edge crossbars 311 and 312 and is secured thereto. The rack 310 is rectangular in shape. The rack 310 extends in a horizontal plane $P_{310}$, the legs 320 to 323 extending in a vertical direction DV2 perpendicular to the plane $P_{310}$. Support arms 330 extend from both sides of the central crossbar 315. More precisely, beside a first face 315a, the central crossbar 315 has a first row of support arms 330 and beside a second face 315b it has a second row of support arms 330. Each support arm 330 extends in a direction parallel to the horizontal plane $P_{310}$ of the rack 310. The arms 330 are spaced apart from one another by a distance $D_{330}$ that is determined as a function of the dimensions and/or the shape of the parts that they are to support.

The second stage 400 comprises a rack 410 that is supported by four legs 420, 421, 422, and 423. More precisely, the rack 410 has a first edge crossbar 411 that connects together the legs 420 and 421, a second edge crossbar 412 that connects together the legs 421 and 422, a third edge crossbar 413 that connects together the legs 422 and 423, and a fourth edge crossbar 414 that connects together the legs 423 and 420. The rack 410 is rectangular in shape. The rack 410 extends in a horizontal plane $P_{410}$, the legs 420 and 423 extending in a vertical direction DV2 perpendicular to the plane $P_{410}$. Support arms 430 extend respectively between the second and fourth edge crossbars 412 and 414. The arms 430 fill the space defined between the four crossbars 411 to 414 of the rack 410 so as to form a horizontal loading tray 440.

Thus, the loading tooling 2 is suitable for supporting parts of different dimensions and/or shapes. Specifically, as shown in FIG. 4, the first loading stage 300 is suitable for being loaded with annular parts 30 presenting a determined diameter, while the second stage 400 is loaded with annular parts 40 and 50 presenting diameters that are different from one another and from the diameter of the parts 30.

In the second loading stage 400, the parts are placed horizontally on the loading tray 440, thus enabling this stage to be loaded with parts having dimensions and/or shapes that are different. Furthermore, having the parts held horizontally on the loading stage 400 makes it possible to treat parts at temperatures that are close to the creep temperature of the material, while minimizing any risk of said parts deforming.

Furthermore, as shown in FIG. 3, the legs 320 to 323 of the first loading stage 300 have respective circular recesses 3200, 3210, 3220, and 3230 in their bottom portions and they have respective circular centering elements 3201, 3211, 3221, and 31231 on their top portions projecting from the top surfaces of the legs. Likewise, the legs 420 to 423 of the second loading stage 200 have respective circular recesses 4200, 4210, 4220, and 4230 in their bottom portions and respective circular centering elements 4201, 4211, 4221, and 4231 on their top portions projecting from their top surfaces of the legs. The circular recesses present in the legs of a loading stage, in this example the recesses 4200, 4201, 4220, and 4230 of the legs 420 to 423 of the second loading stage 400, are for engaging with the circular center elements of the legs of another loading stage, specifically the circular centering elements 3201, 3211, 3221, and 3231 of the first loading stage 100, on which the loading stage is placed. This serves to facilitate both positioning the loading stages while they are being stacked and also keeping them in position on one another in the loading tooling stack. The elements used in the bottom and top portions of the legs of each loading stage enabling the legs of one load to be engaged with the legs of another load that is adjacent in the stack may naturally have shapes other than those described above.

The loading tooling of the invention is not limited to the above-described embodiments. Specifically, the tooling of the invention may have a greater number of loading stages, the stacked stages potentially corresponding equally well to stages for loading vertically such as the above-described loading stages 100, 200, and 300, and stages for loading horizontally, such as the above-described loading stage 400. The modularity of the loading tooling of the invention makes it possible to envisage a large number of configurations with these two types of loading stage. The parts supported by the loading stages may be of shapes other than an annular shape.

Furthermore, the legs of each loading stage may be configured to be adjustable in height so as to enable the height of the support arms above the floor or above the underlying loading stage to be adjusted. By way of example, the height of the legs can be adjusted by means of legs that are telescopic or by adding spacers to the legs.

In accordance with the present invention, the elements constituting the loading tooling of the present invention, namely the loading stages, are made out of thermostructural composite material that withstands temperatures higher than can be withstood by metal materials such as steel.

In known manner, the loading stages constituting the loading tooling are preferably made of carbon/carbon (C/C) composite material, which is a material made up of carbon fiber reinforcement densified by a carbon matrix and possibly provided with a coating such as a deposit of ceramic (e.g. SiC) for example. These elements may equally well be made of ceramic matrix composite (CMC) material, which is a material made up of carbon or ceramic fiber reinforcement densified by a matrix that is ceramic, at least in part, such as any of the following CMC materials:

carbon/carbon and silicon carbide (C/C—SiC) corresponding to a material made up of carbon fiber reinforcement densified by a matrix corresponding to a carbon phase and to a silicon carbide phase;

carbon/silicon carbide (C/SiC), which is a material made up of carbon fiber reinforcement densified by a silicon carbide matrix;

silicon carbide/silicon carbide (SiC/SiC) corresponding to a material made up of silicon carbide fiber reinforcement densified by a silicon carbide matrix; and oxide/oxide type CMC material corresponding to a material made up of refractory oxide fiber reinforcement, e.g. using fibers based on alumina $Al_2O_3$, densified by a refractory oxide matrix.

It is well known to fabricate parts out of composite material constituted by fiber reinforcement densified by a matrix. Such fabrication comprises mainly preparing a fiber structure, specifically made of carbon or ceramic fibers, shaping the fiber structure so as to have a shape close to the shape of the part that is to be fabricated (fiber preform), and then densifying the preform with the matrix.

The fiber preform constitutes the reinforcement of the part and it plays an essential role concerning its mechanical properties. The preform is obtained from fiber textures made of carbon or ceramic fibers. The fiber textures used may be various kinds and forms, such as in particular:

a two-dimensional (2D) woven fabric;

a three-dimensional (3D) woven fabric obtained by 3D or multilayer weaving;

a braid;

a knit;

a felt; or a unidirectional (UD) sheet of yarns or tows or multidirectional (nD) sheets obtained by superposing a plurality of UD sheets in different directions and bonding together the UD sheets, e.g. by stitching, by a chemical bonding agent, or by needling.

It is also possible to use a fiber structure made up of a plurality of superposed layers of woven fabric, braid, knit, felt, sheets, tows, etc., which layers are bonded together, e.g. by stitching, by implanting yarns or rigid elements, or by needling.

The shaping is performed by weaving, stacking, needling two-dimensional/three-dimensional plies or sheets of tows, etc.

The fiber preform is then densified in well-known manner using a liquid and/or a gas technique.

Densification by a liquid technique consists in impregnating the preform with a liquid composition containing a precursor for the matrix material. The precursor is usually in the form of a polymer, such as a resin, possibly diluted in a solvent. The precursor is transformed into carbon or ceramic by heat treatment, after eliminating the solvent if any, and after curing the polymer. A plurality of successive impregnation cycles may be performed in order to achieve a desired degree of densification.

By way of example, a carbon precursor resin may be a resin of phenolic type.

By way of example, a ceramic precursor resin may be a polycarbosilane resin, which is a precursor of silicon carbide (SiC), or a polysiloxane resin, which is a precursor of SiCO, or a polyborocarbosilazane resin, which is a precursor of SiCNB, or a polysilazane resin (SiCN).

The operations of impregnating and polymerizing the carbon precursor resin and/or the ceramic precursor resin may be repeated several times, if necessary for obtaining determined mechanical characteristics.

In known manner, the fiber preform may equally well be densified by a gas technique by chemical vapor infiltration (CVI) of the matrix. The fiber preform corresponding to the structure that is to be made is placed in an oven into which a reaction gas phase is admitted. The pressure and the temperature in the oven and the composition of the gas phase are selected in such a manner as to enable the gas phase to diffuse within the pores of the preform in order to form the matrix therein by depositing a solid material in the core of the material in contact with the fibers, which solid material results from a component of the gas phase decomposing or from a reaction between a plurality of components, as contrasted to pressure and temperature conditions that are specific to chemical vapor deposition (CVD) processes which lead to deposition taking place exclusively on the surface of the material.

A carbon matrix may be formed using hydrocarbon gases such as methane and/or propane that give carbon by cracking, while an SiC matrix may be obtained with methyltrichlorosilane (MTS) that gives SiC by decomposition of the MTS.

For a C/C—SiC material, the first phase made of carbon may be formed with hydrocarbon gases giving carbon by cracking, and thereafter the second phase made of SiC may be deposited on the carbon first stage, e.g. by decomposition of MTS.

Densification combining a liquid technique and a gas technique can also be used in order to facilitate working, limit cross, and limit fabrication cycles, while still obtaining characteristics that are satisfactory for the intended use.

Openings may be machined in the elements constituting the loading stages, such as for example in the legs and the crossbars of the stages, in order to further lighten their weight and thereby reduce their thermal inertia.

When making loading stages out of C/C composite material, the support arms may be coated in a layer of ceramic material, e.g. mullite or yttrium oxide ($Y_2O_3$) in order to avoid any carburizing of or any eutetic formation with the parts in contact with the arms. In a variant embodiment, the support arms may include respective inserts of metal material against which the parts rest in order to avoid direct contact between the parts and the carbon of the arms.

The loading stages of the loading tooling of the invention may equally well be made from a metal alloy that withstands high temperatures, such as the following Fe—Cr—Ni refractory steels: Z40 CN 25-20 (AFNOR) & HK (ASTM); Z25 NCNb 38-18-02 (AFNOR) & HU 25 (ASTM); and Z60 NC 52-17 (AFNOR).

The loading stages may be made as single pieces or they may comprise a plurality of individual elements, e.g. the legs, the crossbars, and the support arms, which pieces are assembled together in order to form a loading stage. Under such circumstances, the support arms may be removably assembled with the central crossbar, thus making it possible to have support arms that are interchangeable and to select support arms that are appropriate for the parts that are to be supported.

Figure 5:
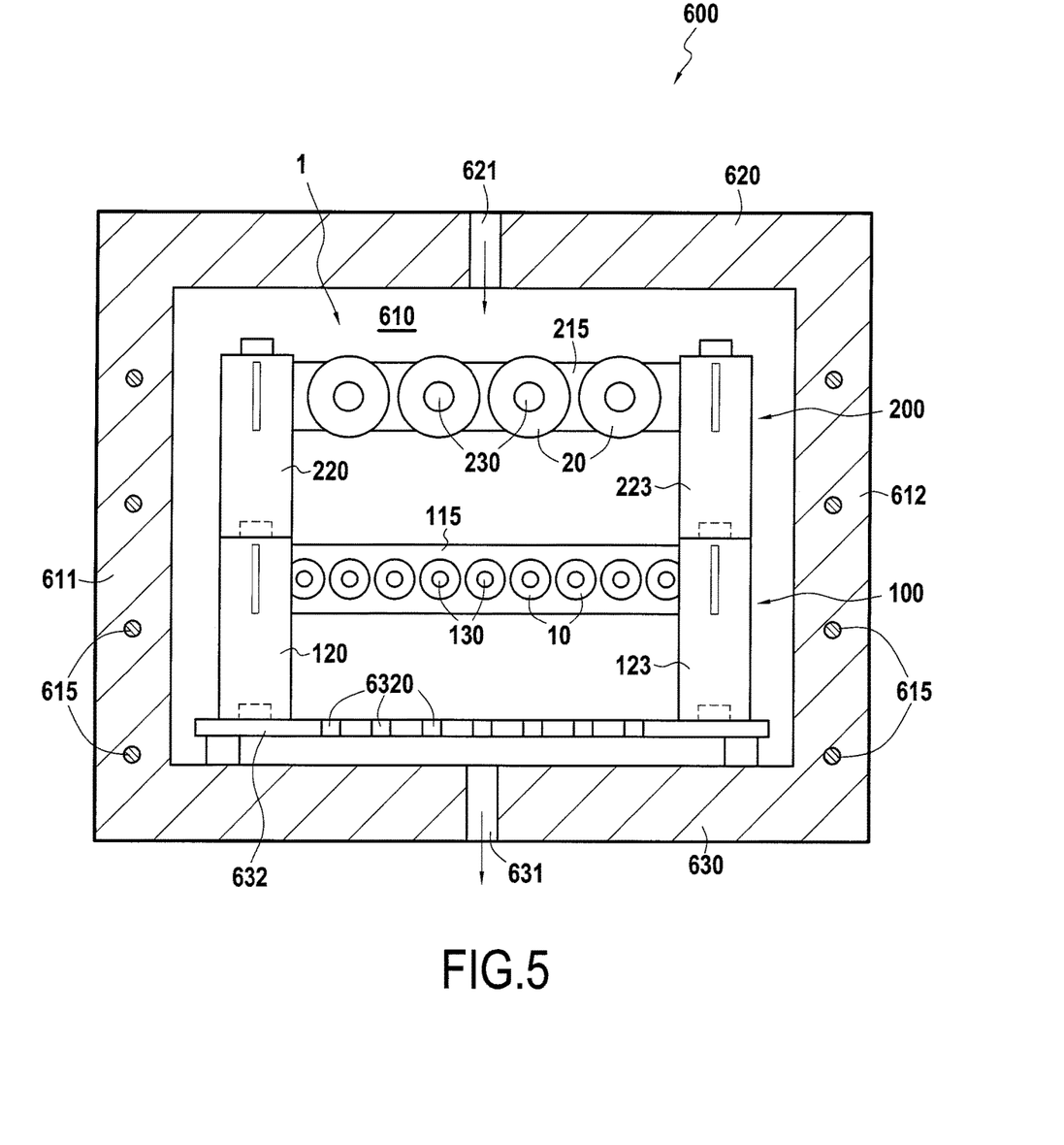
FIG. 5 is a diagrammatic section view of a heat treatment or thermochemical treatment installation in an embodiment of the invention.

FIG. 5 is a diagram showing an oven or installation 600 for heat treatment or thermochemical treatment that is loaded in this example with the loading tooling 1 of FIG. 2 with parts 10 and 20. The installation 600 comprises a rectangular treatment chamber 610 defined by side walls, FIG. 2 showing two side walls 611 and 612 extending in the transverse direction of the treatment chamber. Each of the side walls is provided with heater means, specifically electrical resistances 615 embedded in each wall. The treatment chamber is closed on top by a removable lid 620 having a gas admission pipe 621 for enabling one or more additive materials to be introduced in gaseous form during the heat treatment of the parts, where appropriate. Gas is extracted through the bottom 630 of the installation by a discharge pipe 631 that is connected to suction means (not shown). The bottom 630, which closes the reaction chamber in its bottom portion, comprises a plate 632 having a plurality of gas discharge orifices 6320 and on which the loading tooling 1 is to stand. The number of gas admission pipes 621 and of discharge pipes 631 is determined as a function of the dimensions of the treatment chamber that is to be fed.

Naturally, depending on the working volume available in the treatment chamber, it is possible to place loading tooling of greater volume therein, i.e. tooling having a larger number of loading stages. Likewise, a plurality of stacks of loading tooling each comprising a plurality of loading stages may be placed one beside another in the treatment chamber if it is of sufficient volume.

The invention claimed is:

1. A loading tooling for thermochemical treatment of parts, the tooling comprising at least first and second loading stages stacked one on the other in separable manner, each loading stage comprising a rack extending in a horizontal plane, the rack being supported by four legs extending in a vertical direction with the legs of the second loading stage standing on the legs of the first loading stage, and the rack having a plurality of support arms secured thereto, with the plurality of support arms of the first loading stage presenting an arrangement that is different from the arrangement of the plurality of support arms of the second loading stage;
wherein the rack of the first loading stage comprises a central crossbar, a first plurality of support arms extending on either side of the central crossbar in a direction parallel to the horizontal plane of the rack, the arms of the first plurality of support arms each presenting a free end and being spaced apart from one another at a first distance, and wherein the rack of the second loading stage comprises a central crossbar, a second plurality of support arms extending on either side of the central crossbar in a direction parallel to the horizontal plane of the rack, the arms of the second plurality of support arms each presenting a free arm and being spaced apart from one another by a second distance different from the first distance.

2. The tooling according to claim 1, wherein each loading stage is made of carbon/carbon composite material.

3. The tooling according to claim 2, wherein at least the support arms of the plurality of support arms of each loading stage are coated in a layer of ceramic material.

4. The tooling according to claim 1, wherein each loading stage is made of ceramic matrix composite material or of oxide/oxide type ceramic matrix composite material.

5. The tooling according to claim 1, wherein bottom portions of the legs of each loading stage is configured to engage with top portions of the legs of each loading stage.

6. The tooling according to claim 1, wherein the legs of each loading stage are adjustable in height.

7. The tooling according to claim 1, wherein the support arms of each loading stage are separably fastened to the rack of said loading stage.

8. An installation for heat treatment or thermochemical treatment of parts, the installation comprising a treatment chamber and one or more stacks of loading tooling according to claim 1 present in said treatment chamber, the or each loading stage of the loading tooling supporting parts of shapes or dimensions that are different.

* * * * *